United States Patent [19]

Hooper

[11] Patent Number: 4,697,982

[45] Date of Patent: * Oct. 6, 1987

[54] ROTARY PULP SCREEN OF THE HORIZONTAL TYPE HAVING PULP STOCK FEED AT DIFFERENT AXIAL POSITIONS ON THE SCREEN

[75] Inventor: Anthony W. Hooper, Montreal, Canada

[73] Assignee: Uniweld Inc., Sherbrooke, Canada

[*] Notice: The portion of the term of this patent subsequent to Feb. 10, 2004 has been disclaimed.

[21] Appl. No.: 888,220

[22] Filed: Jul. 23, 1986

Related U.S. Application Data

[63] Continuation-in-part of Ser. No. 839,829, Mar. 13, 1986, abandoned, which is a continuation of Ser. No. 586,816, Mar. 6, 1984, abandoned.

[51] Int. Cl.$^4$ .............................................. F04D 29/70
[52] U.S. Cl. ................................ 415/121 G; 209/273; 209/280; 210/377
[58] Field of Search ................... 415/121 G; 209/273, 209/254, 284, 240, 270, 279, 280, 283, 300, 305, 306; 210/1, 360, 377, 456, 380.1, 213, 214, 512, 787, 405

[56] References Cited

U.S. PATENT DOCUMENTS

| 68,356 | 9/1867 | Evans | 127/19 |
|---|---|---|---|
| 310,469 | 1/1885 | Schlatter | 209/273 |
| 1,134,304 | 4/1915 | Westbye | 209/273 |
| 3,037,629 | 6/1962 | Fontein et al. | 209/254 |
| 3,081,873 | 3/1963 | Cowan et al. | 209/273 |
| 3,275,156 | 9/1966 | Valtanen et al. | 210/415 |
| 3,400,820 | 9/1968 | Nelson | 209/273 |
| 3,508,651 | 4/1970 | Hooper | 210/65 |
| 3,713,536 | 1/1973 | Hooper | 209/273 |
| 3,785,495 | 1/1974 | Holz | 210/210 |
| 4,066,547 | 1/1978 | Hoks | 210/78 |
| 4,202,761 | 5/1980 | Holz | 209/17 |
| 4,268,381 | 5/1981 | Hooper | 209/273 |
| 4,374,728 | 2/1983 | Gauld | 209/273 |

Primary Examiner—Robert E. Garrett
Assistant Examiner—John T. Kwon
Attorney, Agent, or Firm—Larson and Taylor

[57] ABSTRACT

A rotary pulp screening device of the horizontal type is disclosed having a high screening efficiency and high capacity. The screening device provides a streamline flow of pulp and one of its aims is to supply a fairly constant velocity of pulp along the length of the screen thus utilizing its full length. A cylindrical housing is included with a horizontal cylindrical screen therein, a rotary impeller mounted for rotation about a horizontal axis within the screen, the impeller having a body with an inlet end substantially in line with a fixed disc ring forming part of the housing, and an outlet end adjacent the upstream end of the cylindrical screen, the body having a shape with a circular axial cross section from the inlet end to the outlet end thus leaving a larger annular space at the inlet end representing an annular inlet between the disc ring and the body of the impeller, and impeller blades radiating from at least a portion of the body of the impeller and extending to within a short distance from the screen for the length of the screen. The improvement comprises at least one substantially frusto-conical shaped baffle, concentric with the body of the impeller, extending from the annular inlet, adapted to divide a flow of pulp entering the annular inlet and direct the divided flows to different locations along the pulp screen.

23 Claims, 17 Drawing Figures

ROTARY PULP SCREEN OF THE HORIZONTAL TYPE HAVING PULP STOCK FEED AT DIFFERENT AXIAL POSITIONS ON THE SCREEN

This application is a continuation-in-part application of Ser. No. 839,829 filed Mar. 13, 1986, now abandoned which is a continuation application of Ser. No. 586,816 filed Mar. 6, 1984 now abandoned.

The present invention relates to rotary screening of pulp stock and more particularly to improvements in both the method and the device for screening pulp stock in horizontal screens.

The screening of a wood pulp slurry is necessary in the production of paper to remove large fibers, shives and other rejects. Over the years, equipment and processes to screen the pulp have improved. Initially pulp stock was passed through a vibrating screen, an improvement of this method was a cylindrical pulsating method where foils were rotated inside a screen to produce a pulsating effect on a mat of fibers adjacent the screen. The present method, and the one that is used in most modern paper mills, is the rotating method where fibers are screened in a cylindrical screen. The screens may be vertical or horizontal, in the case of a horizontal screen, a series of impeller blades rotate inside the screen, and pulp slurry is fed in at the inlet end of the screen. As the slurry passes through the screen, the fibers rotate due to the movement of the impeller blades and at the same time have an axial movement along the screen so that the reject particles in the pulp stock are held inside the screen and conveyed to the exit end of the screen where they are removed via a reject chamber.

Cowen et al. in U.S. Pat. No. 3,081,873 discloses a horizontal pulp screen which operates at atmospheric pressure. An improvement on this screen is a pressurized horizontal pulp screen as shown by Hooper in U.S. Pat. No. 3,508,651. The pressurized pulp screen has a greater throughput of pulp stock than the non-pressurized atmospheric discharge screen.

As disclosed in U.S. Pat. No. 3,713,536 and U.S. Pat. No. 4,268,381, which both refer to vertical screens, it is shown that a pulp stock flow through the pulp screening device follows an approximately parabolic curve. To these ends the main shape of the impeller has been arranged so the distance between the screen and the impeller face at the inlet end of the screen is considerably more than the distance between the screen and the impeller face at the exit end of the screen. The aim of both these prior art designs is to provide a streamline flow of pulp stock through the screening device and also to ensure that the full length of the screen is used. If the axial velocity of the fibers along the screen varies or decreases, plugging of the screen can occur and some screen areas do not screen fibers. This results in the screening device working inefficiently.

Inasmuch as the impeller blades rotate at a constant speed, it is assumed that the pulp stock between the blades and the face of the screen also rotates at a substantially constant speed. However, in the past it has not always been possible to ensure that the the axial speed of the pulp stock adjacent the screen is constant for the full length of the screen. It is, therefore, a purpose of the present invention to direct fresh pulp stock to the screen plate at points axially distant from the inlet end of the pulp screen and thus utilize the full length of the pulp screen. This introduction of fresh pulp stock has the effect of increasing the rate of acceptance of stock through the screen plate at the different axial points, since the highest rate of flow in existing pulp screens is at the inlet where the stock is fresh. It also has the effect of acting as dilution thereby decreasing the need for internal dilution water at the different axial points. The resulting machine maintains a substantially constant velocity for the pulp stock in the axial direction along the face of the screen. In addition to this, dilution water is added downstream of the last point of application of pulp stock to the screen to dilute the remaining pulp stock and ensure a reasonably constant velocity of pulp stock, including rejects, along the face of the screen downstream of the axial points of pulp stock applications.

The arrangement of dividing the pulp stock flow into parts, together with the locations where the parts are directed axially and radially towards the screen, and the quantity of dilution water mixed with the pulp stock downstream of these screen locations, are all variables that can be tuned to suit the geometry of a particular pulp screening device. The highest rate of pulp stock flow always occurs at the inlet end of present day pulp screens, so by having different points on the screen where fresh pulp is introduced, the capacity is increased at those points and consequently increases the capacity of the whole pulp screen.

At the inlet end, the consistency of the pulp stock that has passed through the screen is similar to the consistency of the fresh pulp stock fed to the screen, whereas further along the screen there is a considerable consistency drop. The effect of bringing in fresh pulp stock at different points along the screen is to reduce the overall consistency drop between the pulp stock and the screened pulp stock along the screen. A reduction of this consistency drop is beneficial to the process.

The introduction of fresh pulp stock at different axial points along the screen, coupled with the maintenance of a substantially constant axial velocity of the pulp stock along the screen, has the effect of making the pulp screen unit more stable. It has been observed in field trials that the pulp screen unit of the present invention is more difficult to plug than existing pulp screens, and furthermore, the screen unplugs with only minor corrective action, as compared to existing types of pulp screens.

It has been found that this arrangement of screening pulp stock increases the efficiency of the screen inasmuch as less horsepower is required to rotate the impeller for a similar flow of pulp stock through a known type of screening device. Alternatively, an increased flow of pulp stock may be screened for the same horsepower requirement using a known type of screening device.

Several horizontal rotary pulp screens exist today and it has been found that by the introduction of a new rotor which has a form of parabolic cone as disclosed in U.S. Pat. No. 4,268,381 with baffles to introduce fresh pulp stock at different points along the screen, the efficiency of existing horizontal pulp screens is increased and horsepower requirements are reduced.

Although unpressurized pulp screens are seldom manufactured today, there are still many paper mills in which horizontal atmospheric discharge pulp screens are in use. It has been found that a new impeller rotor according to the present invention can be fitted to older type atmospheric discharge screens and the pulp stock capacity of the screen can be increased by approximately 50% compared to the old type rotors. This increase in capacity is achieved at substantially the same power requirements and generally at somewhat lower shaft speeds giving the shafts and bearings a longer life. The new impeller can be made to fit existing machines thus having to avoid obtaining a completely new pulp screen machine.

The present invention provides in a rotary pulp screening device of the horizontal pressure type, including a cylindrical housing with an inlet end, means defining a pulp stock entry at the inlet end, horizontal cylindrical screen within the cylindrical housing shaft mounted for rotation, rotary impeller mounted on the shaft within the screen, the impeller having a body with an inlet end adjacent to the inlet end of the housing, the body having a shape with circular axial cross section extending axially from the inlet end, whose diameter increases from the inlet end axially along the screen, thus leaving a larger annular space at the inlet end, means for rotating the shaft and impeller mounted thereon, impeller blades radiating from at least a portion of the body of the impeller and extending to within a short distance from the screen for the length of the screen, and pulp discharge outlet from the cylindrical housing exterior to the screen, the improvement comprising at least one substantially frusto-conical shaped baffle extending axially along the screen from the inlet end of the impeller, with the edge of the baffle adjacent the inlet end parallel to the edge of the baffle remote from the inlet end, the baffle being disposed in the annular space between the body of the impeller and the screen, the exterior surface of the baffle being joined to the impeller blades and having a shape to conform to the shape of the body of the impeller to define an annular axial cross sectional opening having a substantially equal axial cross sectional area from one edge of the baffle to the opposite end thereof, the baffle forming means dividing the flow of pulp stock entering at the inlet end so that a portion of the pulp stock passes across the exterior surface of the baffle and a portion of the pulp stock passes between the baffle and the body of the impeller, and whereby the substantially equal axial cross sectional area from one end of the baffle to the opposite end thereof maintains a substantially constant axial velocity of the pulp stock passing between the baffle and the body of the impeller.

In an embodiment of the invention, the axial length of the baffle is preferably about 20% of the length of the cylindrical screen and dilution water is preferably applied to the cylindrical screen downstream from the baffle. In another embodiment the impeller has a paraboloidal segment shaped body, which may be formed from a plurality of frusto-conical segments. In a still further embodiment, the impeller has a frusto-conical shaped body.

In yet a further embodiment, a plurality of baffles are provided extending downstream one after another, this embodiment is particularly useful in long screens.

In a still further embodiment, there is provided a rotary impeller adapted to rotate inside a cylindrical screen of a pulp screening device of the horizontal type, the impeller comprising a body having a shape with circular axial cross section for its full length, whose diameter increases from an inlet end axially along its full length, impeller blades radiating from at least a portion of the body of the impeller and extending to within a short distance from the screen for the length of the screen, at least one substantially frusto-conical shaped baffle extending from the inlet with the edge of the baffle adjacent the inlet extending parallel to the edge of the baffle remote from the inlet, said baffle being disposed in the annular space between the body of the impeller and the screen, said baffle being joined to the exterior surface of the impeller blades and having a shape to conform to the shape of the body of the impeller to define an annular axial cross sectional opening having a substantially equal axial cross sectional area from one end of the baffle to the opposite end thereof, said baffle forming means dividing the flow of pulp stock entering the inlet so that a portion of the pulp stock entering the inlet passes across the exterior surface of the baffle and a portion of the pulp stock entering the annular inlet passes between the baffle and the body of the impeller, and whereby the substantially equal axial cross sectional area from one end of the baffle to the opposite end thereof maintains a substantially constant axial velocity of the pulp stock passing between the baffle and the body of the impeller.

There is also provided in a process of screening a pulp stock in a rotary pulp screening device of the horizontal type including a cylindrical housing with an inlet end, means defining a pulp stock entry at the inlet end, horizontal cylindrical screen within the cylindrical housing, shaft mounted for rotation extending on a central axis through the housing, rotary impeller mounted on the shaft within the screen, the impeller having a body with an inlet end adjacent to the inlet end of the housing, the body having a shape with circular axial cross section extending axially from the inlet end whose diameter increases from the inlet end axially along the screen, thus leaving a larger annular space at the inlet end, means for rotating shaft and rotary impeller mounted thereon, impeller blades radiating from at least a portion of the body of the impeller and extending to within a short distance from the screen for the length of the screen, at least one substantially frusto-conical shaped baffle concentric with the body of the impeller, extending from the inlet end of the impeller, adapted to divide flow of pulp stock entering the annular inlet, the baffle forming an annular axial cross sectional opening between the baffle and the body of the impeller having a substantially similar cross sectional area at the inlet end as at the downstream end of the baffle, and the baffle joined to the impeller blades, the opening between the baffle and the body of the impeller having no impeller blades therein, and pulp discharge outlet from the cylindrical housing exterior to the screen, wherein pulp stock entering the annular inlet is rotated by the impeller blades, flows along the screen and mixes with dilution water, the pulp stock passing through the screen for substantially the full length of the screen and exiting through the pulp discharge, the improvement comprising the steps of:

dividing the flow of pulp stock entering the annular inlet into a plurality of parts so that the pulp stock passing between the impeller and the baffle is rotated by the impeller blades only after passing beyond the baffle, directing each of the parts to different locations along the length of the screen, such that the velocity of pulp stock along the screen is substantially constant and adding dilution water to the pulp stock at further downstream locations on the screen after the locations where the parts are directed such that the velocity of the pulp stock along the screen remains substantially constant.

In yet a further embodiment, the flow of pulp stock is divided into a plurality of equal parts, the first part directed at the inlet end of the screen and the remaining parts directed at distances apart representing about 20% of the length of the screen.

In drawings which illustrate embodiments of the invention.

Figure 1:
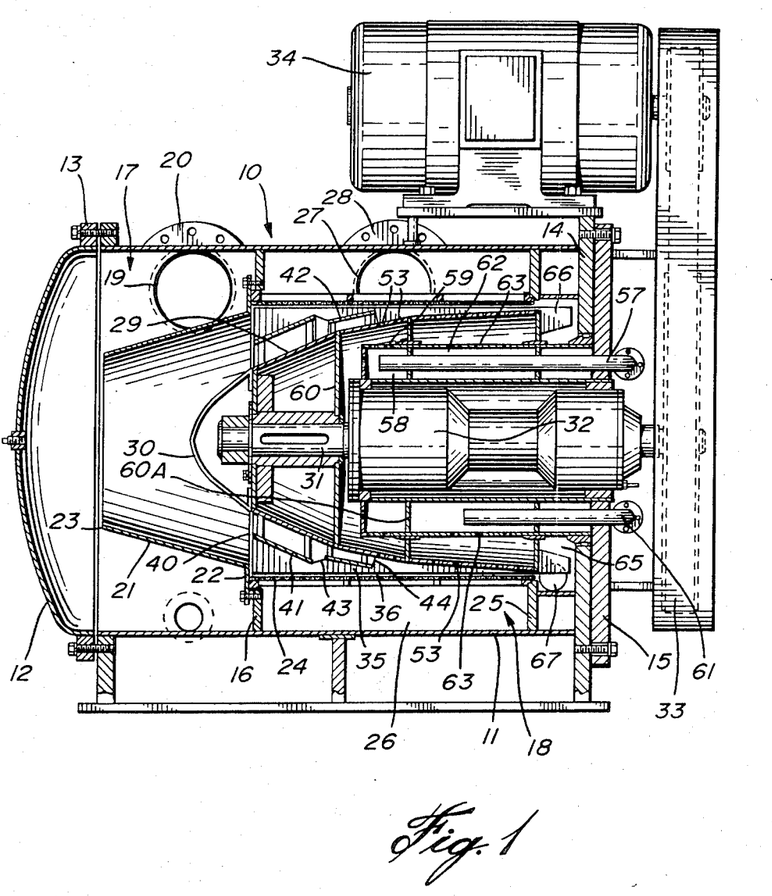
FIG. 1 is a side elevational section of one embodiment of a horizontal rotary pulp screening device of the present invention with two baffles.

One embodiment of a pulp screening device 10 is shown in FIG. 1 having a generally cylindrical housing 11 with an end cover 12 joined to the cylindrical housing 11 at inlet flange 13. The cylindrical housing 11 has an outlet flange 14 which is joined to an end impeller mounting flange 15.

In the cylindrical housing 11, spaced in from the inlet flange 13, is a disc ring 16, which divides the housing into an inlet chamber 17, upstream of the disc ring 16, and a screening chamber 18, downstream of the disc ring 16. A tubular inlet pipe 19, having a flange 20, at the end thereof provides entry to the inlet chamber 17. A conical inlet ring 21 has a flange 22, at its largest diameter which is attached to the disc ring 16. The flange 22, overlaps the disc ring 16, so that pulp stock passing into the inlet chamber 17, moves along the conical side of the inlet ring 21, and passes over a small diameter lip 23, flowing through the conical inlet ring 21, into the screening chamber 18.

A horizontal cylindrical screen 24, is mounted axially in the screening chamber 18, and extends to an output screen flange 25 in the chamber 18, attached to the housing 11, from the disc ring 16. An accept chamber 26 is provided in the screening chamber 18 outside the screen 24. An accept outlet 27 is provided tangential to the accept chamber 26, in the cylindrical housing 11, and allows the screened accept fibers to leave the screening device 10. A flange 28 at the end of the outlet 27, provides a connection to discharge ducts.

A rotary impeller 29 is positioned axially within the screen 24. In the embodiment shown, the rotary impeller 29 in the screening area is shaped approximately in the form of a paraboloid segment. The paraboloid segment is formed from a series of truncated cones joined together and has a curved nose cone 30 at the inlet end so the overall shape of the impeller is paraboloidal. The impeller 29, is made in this manner for ease of construction, but the approximate paraboloid shape provides streamline flow to the screen. In the embodiment shown, the nose cone 30 extends upstream into the conical inlet ring 21 of the inlet chamber 17. In other embodiments, the nose cone 30 may be omitted. The shape of the impeller may be formed from only two truncated cones with different slopes as disclosed in U.S. Pat. No. 3,713,536 dated Jan. 30, 1973.

The present invention can be applied to existing rotary screens by retrofitting a new impeller in an existing screen. The retrofit impeller may have a frusto-conical shape rather than a paraboloid shape or two different truncated cones with different shapes.

Figures 2, 3:
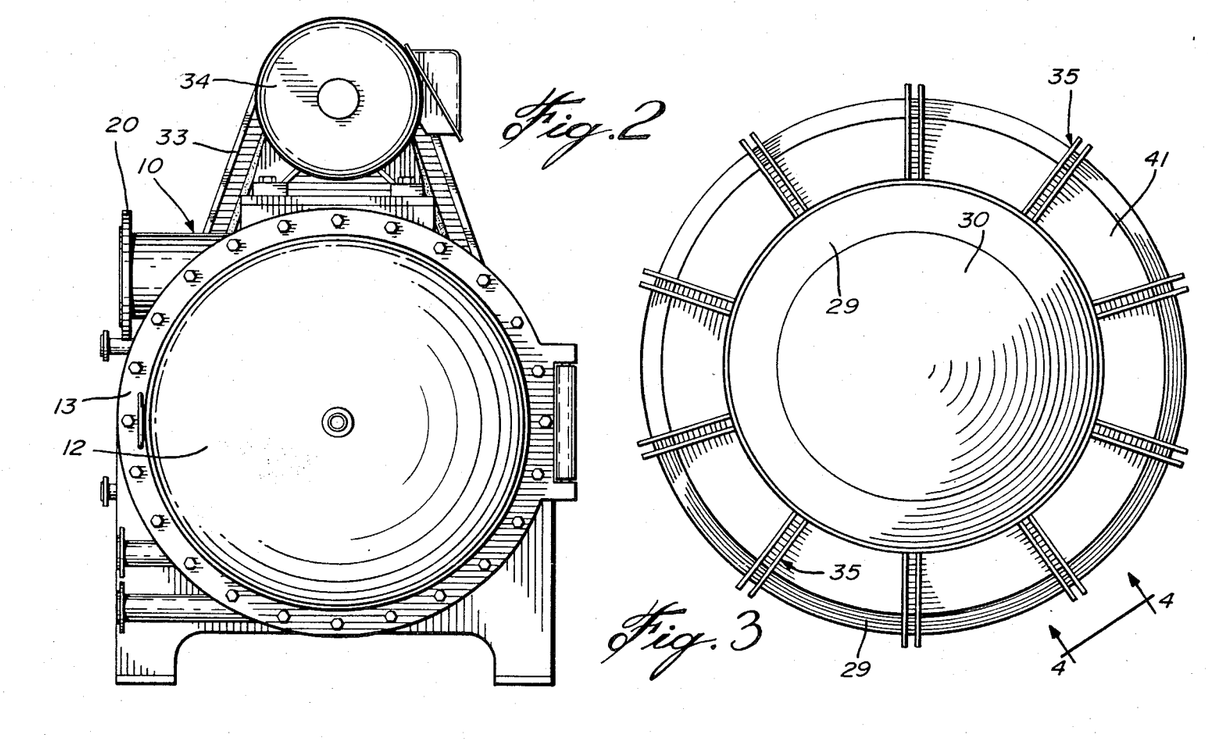
FIG. 2 is an end view of the screening device shown in FIG. 1.
FIG. 3 is an end view of the impeller and rotor blades for the screening device shown in FIG. 1.

The rotary impeller 29 is mounted on a rotating axial drive shaft 31 which rotates in a bearing assembly 32 about the axis of the cylindrical screening device 10. The drive shaft 31 is connected to a V-belt drive 33 connected to an electric motor 34 mounted on top of the screening device 10. FIG. 2 shows the inlet end view of the assembly.

A number of impeller blades 35 are equi-spaced about the rotary impeller 29 radiating from at least a portion of the body of the impeller 29. The blades 35 extend to within a short distance from the screen 24 for the full length of the screen 24 leaving an annular space 36 between the tips of the blades 35 and the screen 24. Details of the arrangement of rotor blades 35 and impeller 29, are shown in more detail in FIGS. 3-5. An annular inlet 40 is formed at the entrance to the screening chamber 18, at the disc ring 16 where the pulp stock passes from the inlet ring 21 into the screening chamber 18. A first baffle 41 having a substantially frusto-conical shape is located concentric with the surface of the impeller 29, extending downstream from the annular inlet 40. The first baffle 41 is shown substantially parallel with the surface of the impeller 29 for the length of the first baffle 41. It is not essential for the baffle 41 to be parallel to the surface of the impeller 29, however, it is necessary for the annular axial cross sectional opening between the baffle 41, and the surface of the impeller 29, to have a substantially similar cross sectional area for the full length of the baffle 41. By keeping this cross sectional area constant for the length of the baffle, the velocity of the pulp stock passing between the baffle 41 and the surface of the impeller 29 remains about the same. The baffles are described as being frusto-conically shaped, however, they may be flat or curved dependent upon the shape of the impeller surface and are designed to provide constant velocity to the pulp stock flowing therein. A second frusto-conical shaped baffle 42, also concentric with the surface of the impeller 29, is positioned downstream from the first baffle 41 leaving an aperture 43 between the outlet end of the first baffle 41 and the inlet end of the second baffle 42. Like the first baffle 41, the second baffle 42 is shown as being substantially parallel to the surface of the impeller 29 for the length of the second baffle 42. As in the case of the first baffle 41, the cross sectional area between the second baffle 42 and the surface of the impeller 29 is substantially the same for the length of the second baffle 42. The annular space between both baffles 41 and 42 and the surface of the impeller 29 may have no impeller blades 35, therein and, therefore, is open. However, the impeller blades 35 radiate outward from the baffles 41 and 42 to the annular space 36 so that the tips of the blades 35 extend for the full length of the screen. In a preferred embodiment, the annular space between the impeller blades 41 and 42, and the surface of the impeller 29 is open, that is to say, no impeller blades extend through this space so that initially when pulp stock enters this area it is not immediately rotated by the action of the impeller blades 35.

The positioning of the two frusto-conical baffles 41 and 42 divides the flow of pulp stock entering the pulp inlet 40 into separate parts, two baffles provide three parts of pulp stock flow directed at different locations along the pulp screen 24. In the embodiment shown, the position of the first baffle 41 in the annular inlet 40 is such that the pulp stock flow is divided into two parts, a first part which flows outside the first baffle 41 between the first baffle 41 and the inlet ring 22 into the impeller blades 35 where it is immediately rotated by the impeller blades. Much of this first part of the pulp stock passes through the first portion of the screen 24, however, a rotating mat of fibers is formed and there is an axial flow of pulp stock horizontally along the screen. The second part of the pulp stock flow entering the annular inlet 40, flows along the surface of the impeller 29, and in the preferred embodiment is not subjected to substantial rotation. The first part and the second part of pulp stock flow may be about equal, or the second part may be twice that of the first part, depending upon the arrangement of baffles. The second part is then divided into two separate and substantially equal parts at the outlet end of the first baffle 41. The first of these two equal parts exits through aperture 43 and is immediately rotated by the impeller blades. Much of the pulp stock in this second part joins the rotating mat of fibers and passes through the screen, however, there is an axial horizontal movement of the pulp stock in the mat of fibers along the surface of the screen. This movement is at substantially the same speed as the movement of the first part of the pulp stock entering at the first portion of the screen 24. The last part of the pulp stock exits through aperture 44 at the outlet end of the second baffle 42 between the second baffle 42 and the surface of the impeller 29 and as in the case of the other parts of pulp is immediately rotated by the impeller blades 35 and joins the rotating mat of fibers. Some of the pulp stock passes through the screen and there is a movement of the pulp stock in the mat of fibers axially along the screen at the same speed as the other two parts of pulp. The length of each of the baffles 41 and 42 is preferably substantially the same, each baffle has a length of approximately 20% of the total length of the cylindrical screen 24.

Thus in the embodiment shown, pulp stock entering the annular inlet 40 is, in effect, divided and three parts of pulp are delivered to the impeller blades 35 and consequently to the pulp screen 24 at different locations along the pulp screen 24. The length of the baffles and the position of the baffles is determined primarily by the flow characteristics entering the annular inlet 40. Other considerations include the type of screen and the type of pulp stock being screened. The criteria is to ensure that the axial movement of pulp stock moving along the screen has substantially the same velocity from the inlet end to the outlet end of the screen.

Whereas two baffles are shown in FIG. 1, small pulp screening devices may have only one baffle therein, long pulp screening devices may have three or more baffles. Again, the criteria being that the axial velocity of the pulp stock along the screen is arranged to be substantially the same from the inlet end to the outlet end of the screen.

Figure 4:
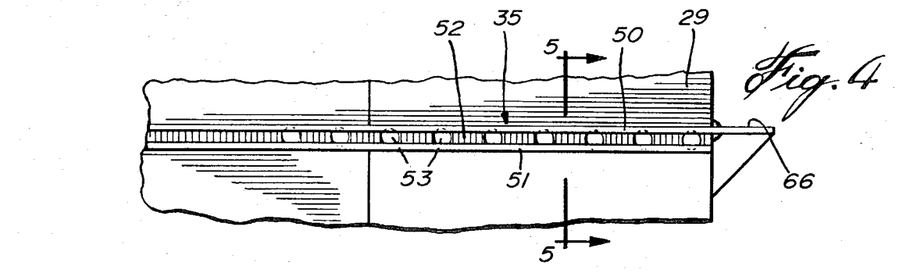
FIG. 4 is an elevational view of one pair of impeller blades at line 4—4 of FIG. 3.
Figure 5A:
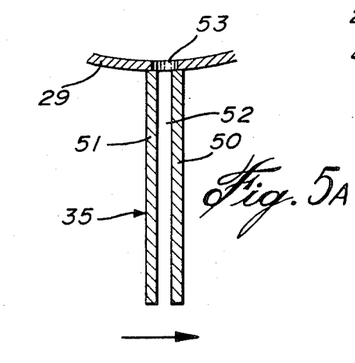
FIGS. 5A to 5G are sectional views taken at line 5—5 of FIG. 4 showing different embodiments of impeller blades.

Different types of impeller blades 35 may be incorporated with rotary pulp screen of the present invention. One type of impeller blade is illustrated in FIGS. 3, 4 and 5A and other types are illustrated in FIG. 5B to 5G. The selection of impeller blades is made dependent upon a number of factors such as the type of pulp stock being screened, the desired properties of the screened pulp and the capacity of the pulp stock through the rotary pulp screen. These listed factors are by no means limiting, neither do they represent the only factors.

The impeller blades 35 shown in FIGS. 3, 4 and 5A, have a first leading blade 50 and a second trailing blade 51 which are spaced apart with a gap 52 therebetween, the blades 50 and 51 to allow dilution water to be sprayed directly from the body of the impeller 29 downstream from the second baffle 42 and have a plurality of holes 53, in the gap 52, between the blades 50 and 51 to allow dilution water to be sprayed directly onto the pulp screen 24. Thus, dilution water is added at locations on the pulp screen 24 downstream from where the parts of pulp stock are fed onto the screen. Sufficient dilution water is applied such that the axial velocity of the mat of fibers moving along the face of the screen remains the same or substantially the same for the full length of the screen 24.

Figure 5B:
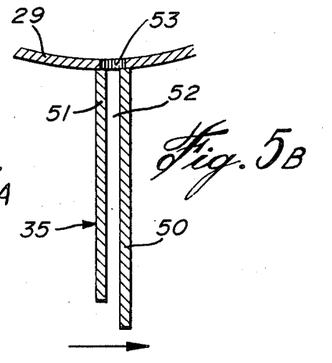
Figure 5C:
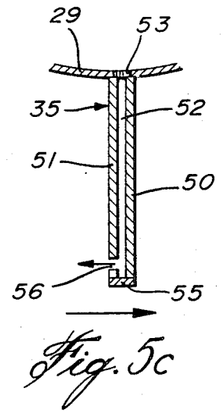
Figure 5D:
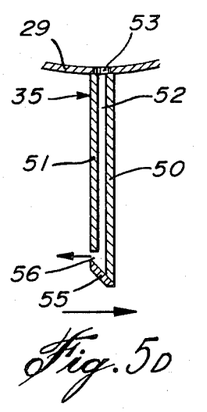
Figure 5E:
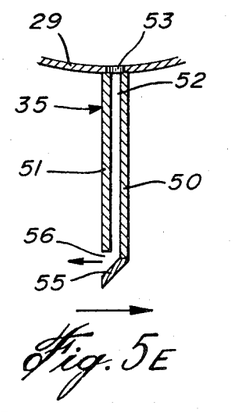
Figure 5F:
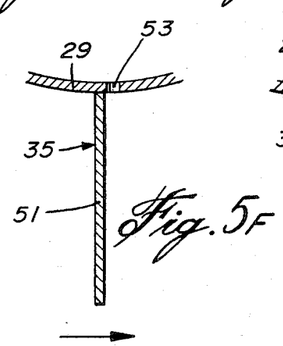
Figure 5G:
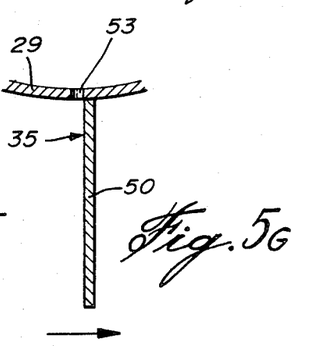

In FIG. 5B the leading blade 50 extends to within a short distance from the screen and the second trailing blade 51 does not extend so far. FIGS. 5C, 5D and 5E illustrate an impeller blade assembly with a cap 55 across the ends of the leading blade 50 and the trailing blade 51 and an exit aperture 56 in the trailing blade 51 for the dilution water. FIGS. 5F and 5G show a single trailing blade 51 and leading blade 50 respectively without a second blade. The dilution water is fed to the screen directly from the hole 53 in the body of the impeller 29. In all embodiments shown, different flows of dilution water are provided along the screen to ensure that the axial velocity of pulp stock is substantially constant along the screen.

A first water inlet duct 57 shown in FIG. 1 leads to a first annular chamber 58 having openings 59 at the sides and the periphery allowing dilution water to pass into that portion of the interior of the impeller body that is adjacent the second baffle 42. A diaphragm plate 60 extending across the body of the impeller 29 prevents dilution water passing into the front of the impeller body. A second diaphragm plate 60A, extends across the body of the impeller downstream of the first annular chamber 58 to contain the dilution water within the first annular chamber 58.

A second water inlet duct 61 leads to a second annular chamber 62 downstream of the second diaphragm plate 60A. The second annular chamber 62 has peripheral openings 63, allowing dilution water to pass into another portion of the interior of the impeller body downstream and adjacent to the portion containing the first dilution water. The two dilution water systems allow different flows along the screen 24.

In one embodiment a reject chamber 65 is provided at the end of the screen 24 and an impeller blade 66 extends into the reject chamber 65 to continually sweep the chamber. In another embodiment, there is virtually no reject chamber. A reject outlet 67 is provided so that fiber rejects, shives, etcetera which pass along the screen and do not pass through the screen, exit from the reject chamber at the end of the screen.

By introducing fresh pulp stock at points along the screen, a higher rate of flow is achieved for the rotary pulp screening device of the present invention. Furthermore, it has been found that the power requirement to rotate the impeller is reduced. This drop in power requirement is believed to be due to the fact that there is a more even use of the pulp screen for its full length, and fibers do not clog up any one area of the screen but flow through the screen for its full length. The majority of the pulp stock does not pass through the first portion of the screen as in most existing pulp screens of the horizontal type. This complete use of the screen combined with the streamline flow through the aperture between the impeller and the screen improves the utilization of the pulp screening device. As the pulp stock moves to the screen surface the impeller blades rotate the pulp stock. The fibers rotate relative to the screen and also have an axial movement which is at a substantially constant velocity horizontally along the screen to the reject chamber 65. The accept pulp fibers pass through the fiber mat which is formed by the shives and other reject fibers together with the accept fibers and then pass through the screen of the accept chamber 26. This axial movement of the pulp stock is substantially constant along the face of the screen, and in order to retain its speed after the second baffle 42, the dilution water ensures that the pulp stock continues its rotation and axial movement. By having separate dilution water supplies, one supply may be at a higher pressure or higher flow than the other supplies to ensure that the axial velocity is substantially the same along the length of the screen. The rejects then pass into the reject chamber 65, where they are ejected through the outlet 67. The accept or screened pulp stock passes out of the accept chamber 26 through outlet 27.

Figure 6:
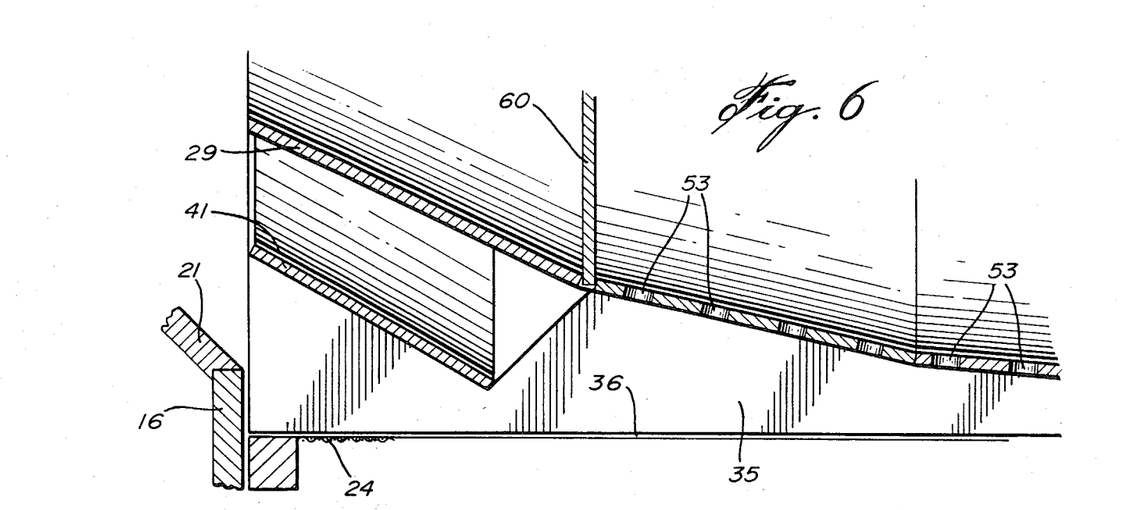
FIG. 6 is a partial side elevational section of another embodiment of a rotary pulp screening device having one baffle.

FIG. 6 shows another embodiment of the pulp out of the accept chamber 26 through outlet 27.

Figure 7:
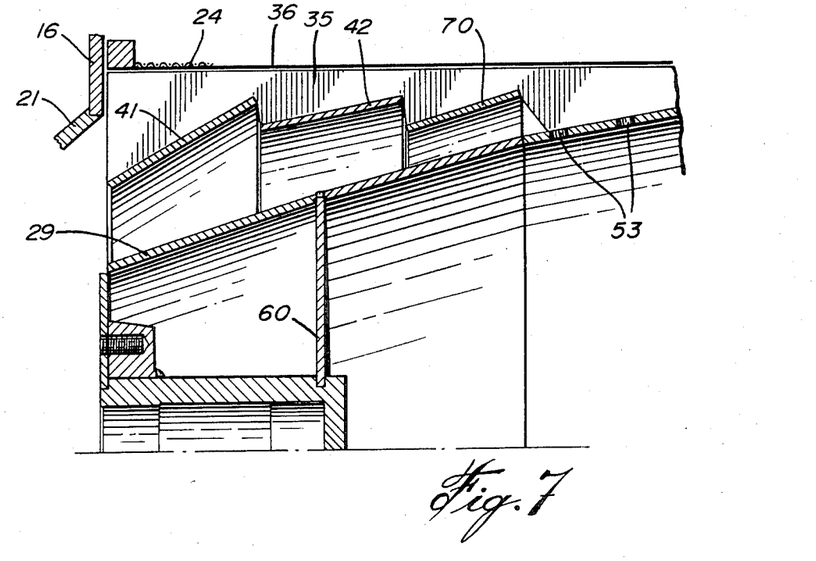
FIG. 7 is a partial side elevational section of yet a further embodiment of a rotary pulp screening device having three baffles.
Figure 8:
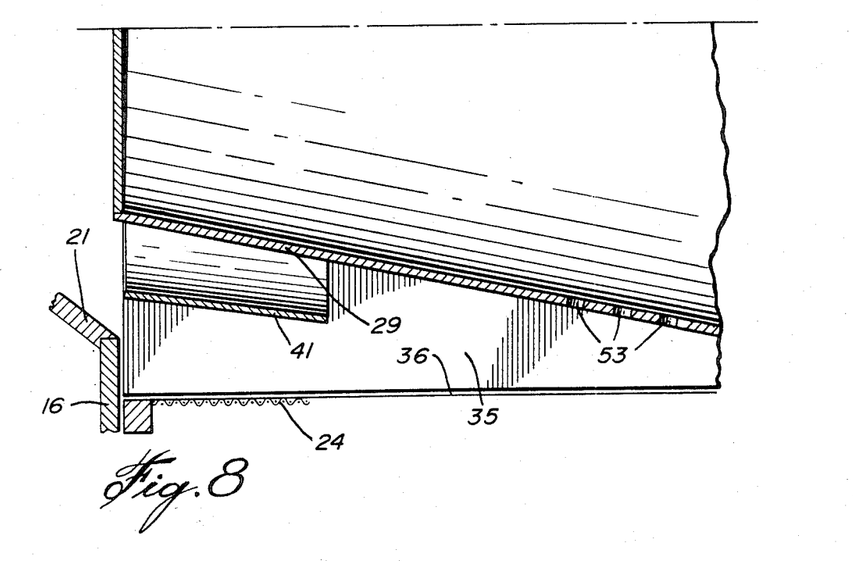
FIG. 8 is a partial side elevational section of a rotary pulp screening device having a frusto-conical shaped impeller body and a single baffle.

FIG. 6 shows another embodiment of the pulp screening device with only one baffle 41. FIG. 7 shows a pulp screening device with three baffles, a first baffle 41, second baffle 42 and a third baffle 70. The spacing between the three baffles is such that the pulp stock flow entering inside the first baffle 41 is divided into three substantially equal parts when exiting between the first baffle 41 and second baffle 42, between the second baffle 42 and the third baffle 70, and after the third baffle 70. FIG. 8 shows an impeller 29 which has a frusto-conical shape and only one slope for the length of the impeller 29. A single baffle 41 is illustrated. This type of impeller would likely be provided to be installed in older types of pulp screening devices.

Figure 9:
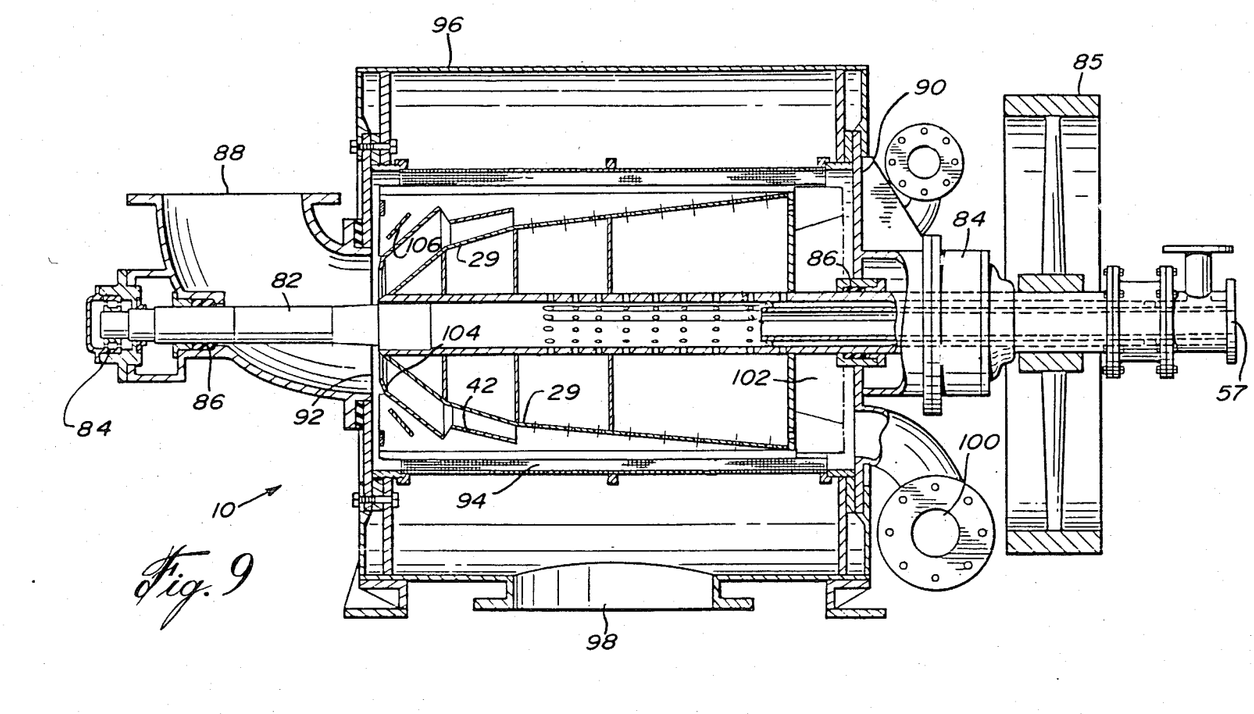
FIG. 9 is a side elevational section of another embodiment of a horizontal pulp screening device of the present invention.
Figures 10, 11:
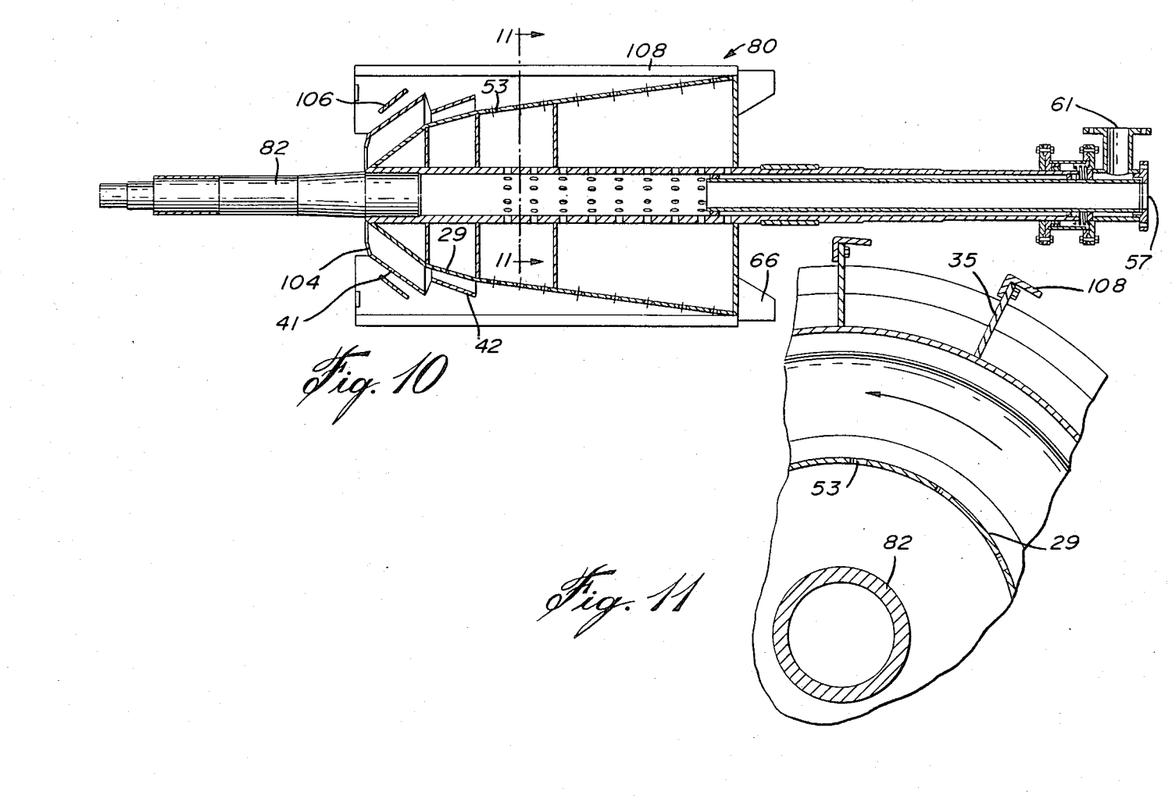
FIG. 10 is a side elevational section of a rotor for the pulp screening device of FIG. 9.
FIG. 11 is a sectional view taken at line 11 of FIG. 10.

Another embodiment of a pulp screening device 10 is shown in FIGS. 9 to 11. A horizontal pulp screen of the type disclosed by Cowan et al. in U.S. Pat. No. 3,081,873 can operate at atmospheric pressure. The new rotor assembly 80 increases the capacity of the screen by up to 50% for the same power requirements. Retrofitting new rotors in existing equipment forestalls the need to purchase and install a new pulp screen and the new rotor rotates at lower speeds than the new rotor which increases bearing life.

The rotor 80 is mounted on a shaft 82 which has bearings 84 at each end and has a drive wheel 85. Seals 86 are provided on the curved inlet pipe 88 and the casing wall 90. The inlet pipe 88 is curved and has no centrifugal flow as in the pressurized type of screen, hence is at a slower flow speed. The inlet pipe 88 leads to an inlet 92 concentric with the shaft 82. The rotor rotates within a cylindrical screen 94 with the casing 96. Accepts exit through accept outlet 98 at the bottom of the casing 96 and a reject outlet 100 is provided for reject discharge from a reject chamber 102 at the outlet or far end of the screening chamber.

The shape of the rotor 80 is substantially the same as that shown in FIG. 1. The rotary impeller 29 does not have a curved nose core as the shaft 82 extends beyond the inlet end 92 of the screen chamber. The first baffle 41 has a shallow deflector portion 104 at the inlet end to act as a deflector for the pulp stock entering the screening chamber. Due to the slower pulp stock flows, this shallow surface deflects a portion of the pulp stock outside the first baffle 41 without restricting the flow. The impeller blades 35 do not extend inside the diameter of the inlet 92, so the pulp stock is divided before rotation is imparted to it.

For large screens, an outer baffle 106 is located exterior to the first baffle 41 to divide the portion of pulp stock deflected by the shallow deflector portion 104, so that it is divided into two further portions. The outer baffle 106 commences after the first baffle 41. By including the baffles shown herein, the full length of the screen is utilized. Fresh pulp stock is brought along the full length of the screen and the pulp stock has an axial velocity along the screen that is substantially the same for almost the full length of the screen.

Another configuration of impeller blades is shown in FIG. 11, with a trailing tip 108 formed by attaching an angle to the blade 35. Apertures 53 in the frusto-conical body 29 allows dilution water from a dilution water supply through hollow shaft 82.

It will be apparent to those skilled in the art, that changes and variations may be made to the pressure pulp screening device of the present application without departing from the scope of the present invention which is limited only by the following claims.

The embodiments of the invention in which an exclusive property or privilege is claimed are defined as follows:

1. In a rotary pulp screening device of the horizontal pressure type, including a cylindrical housing having means defining an inlet chamber and a screening chamber with a disc ring dividing the inlet chamber from the screening chamber, horizontal cylindrical screen within the screening chamber, rotary impeller mounted for rotation about a central horizontal axis within the screen, the impeller having a body with an inlet end adjacent to the disc ring and an outlet end adjacent the end of the cylindrical screen, the body having a shape with circular axial cross section from the inlet end to the outlet end whose diameter increases from the inlet end to the outlet end, thus leaving a larger annular space at the inlet end, and means defining an annular inlet between the disc ring and the body of the impeller, means for rotating the impeller, impeller blades radiating from at least a portion of the body of the impeller and extending to within a short distance from the screen for the length of the screen, and means defining a pulp discharge outlet from the screening chamber, the improvement comprising:

at least one substantially frusto-conical shaped baffle extending from the annular inlet with the edge of the baffle adjacent the inlet extending parallel to the edge of the baffle remote from the inlet, said baffle being disposed in the annular space between the body of the impeller and the screen, said baffle being joined to the impeller blades and having a shape to conform to the shape of the body of the impeller to define an annular axial cross sectional opening having a substantially equal axial cross sectional area from one edge of the baffle to the opposite end thereof, said baffle forming means dividing the flow of pulp stock entering the annular inlet so that a portion of the pulp stock entering the annular inlet passes across the exterior surface of the baffle and a portion of the pulp stock entering the annular inlet passes between the baffle and the body of the impeller and whereby the substantially equal axial cross sectional area from one end of the baffle to the opposite end thereof maintains a substantially constant axial velocity of the pulp stock passing between the baffle and the body of the impeller.

2. The rotary pulp screening device according to claim 1 wherein a frusto-conical inlet ring is provided in the inlet chamber extending upstream from the disc ring with the smallest diameter at the entry to the inlet ring, and the rotary impeller has a cone portion formed to the paraboloidal segment shaped body to form an approximate paraboloid shape.

3. The rotary pulp screening device according to claim 2 wherein the axial length of the baffle is about 20% of the length of the cylindrical screen.

4. The rotary pulp screening device according to claim 2 wherein dilution water is applied to the cylindrical screen downstream from the baffle.

5. The rotary pulp screening device according to claim 1 wherein the impeller has a paraboloidal segment shaped body.

6. The rotary pulp screening device according to claim 5 wherein the paraboloidal segment shaped body is formed from a plurality of frusto-conical segments.

7. The rotary pulp screening device according to claim 1 wherein the impeller has a frusto-conical shaped body.

8. The rotary pulp screening device according to claim 1 wherein two substantially frusto-conical shaped baffles are provided, the first baffle concentric with the body of the impeller extending from the annular inlet, a second baffle concentric with the body of the impeller extending from the end of the first baffle, the two baffles positioned such that the flow of pulp stock entering the annular inlet is divided into three parts, a first part passing through a first annular space between the inlet of the first baffle and the disc ring, a second part passing through a second annular space between the outlet from the first baffle and the inlet of the second baffle, and a third part passing through a third annular space between the outlet from the second baffle and the surface of the body of the impeller.

9. The rotary pulp screening device according to claim 8 wherein the axial length of each baffle is about 20% of the length of the cylindrical screen.

10. The rotary pulp screening device according to claim 8 wherein dilution water is applied to the cylindrical screen downstream from the baffles.

11. The rotary pulp screening device according to claim 1 wherein three substantially frusto-conical shaped baffles are provided extending downstream one after the other.

12. The rotary pulp screening device according to claim 11 wherein the axial length of each baffle is about 20% of the length of the cylindrical screen.

13. rotary pulp screening device according to claim 1 wherein a plurality of substantially frusto-conical shaped baffles are provided extending downstream one after the other.

14. A rotary impeller adapted to rotate inside a cylindrical screen of a pulp screening device of the horizontal type, the impeller comprising:
a body having a shape with circular axial cross section for its full length whose diameter increases from an inlet end axially along its full length,
impeller blades radiating from at least a portion of the body of the impeller and extending to within a short distance from the screen for the length of the screen,
at least one substantially frusto-conical shaped baffle extending from the inlet with the edge of the baffle adjacent the inlet extending parallel to the edge of the baffle remote from the inlet, said baffle being disposed in the annular space between the body of the impeller and the screen, said baffle being joined to the exterior surface of the impeller blades and having a shape to conform to the shape of the body of the impeller to define an annular axial cross sectional opening having a substantially equal axial cross sectional area from one end of the baffle to the opposite end thereof, said baffle forming means dividing the flow of pulp stock entering the inlet so that a portion of the pulp stock entering the inlet passes across the exterior surface of the baffle and a portion of the pulp stock entering the annular inlet passes between the baffle and the body of the impeller, and whereby the substantially equal axial cross sectional area from one end of the baffle to the opposite end thereof, maintains a substantially constant axial velocity of the pulp stock passing between the baffle and the body of the impeller.

15. The rotary impeller as claimed in claim 14 wherein the axial length of the baffle is about 20% of the length of the cylindrical screen.

16. The rotary impeller as claimed in claim 14 wherein a plurality of substantially frusto-conical shaped baffles are provided donwstream one after the other.

17. In a process of screening a pulp stock in a rotary pulp screening device of the horizontal pressure type including a cylindrical housing having an inlet chamber and a screening chamber with a disc ring dividing the inlet chamber from the screening chamber,
horizontal cylindrical screen within the screening chamber,
rotary impeller mounted for rotation about a central horizontal axis within the screen, the impeller having a body with an inlet end adjacent to the disc ring and an outlet end adjacent the downstream end of the cylindrical screen, the body having a shape with circular axial cross section from the inlet end to the outlet end whose diameter increases from the inlet end to the outlet end, thus leaving a larger annular space at the inlet end representing an annular inlet between the disc ring and the body of the impeller,
means for rotating the impeller,
impeller blades radiating from at least a portion of the body of the impeller and extending to within a short distance from the screen for the length of the screen, at least one substantially frusto-conical shaped baffle concentric with the body of the impeller, extending from the inlet end of the impeller, adapted to divide flow of pulp stock entering the annular inlet, the baffle forming an annular axial cross sectional opening between the baffle and the body of the impeller having a substantially similar cross sectional area at the inlet end as at the downstream end of the baffle, and the baffle joined to the impeller blades, the opening between the baffle and the body of the impeller having no impeller blades therein, and pulp discharge outlet from the screening chamber, wherein pulp stock entering the annular inlet is rotated by the impeller blades, flows along the screen and mixes with dilution water, the pulp stock passing through the screen for substantially the full length of the screen and exiting through the pulp discharge, the improvement comprising the steps of:

dividing the flow of pulp stock entering the annular inlet into a plurality of parts by the baffle so that the pulp stock passing between the impeller and the baffle is rotated by the impeller blades only after passing beyond the baffle, directing each of the parts to different locations along the length of the screen, such that the velocity of pulp stock along the screen is substantially constant, and adding dilution water to the pulp stock at further downstream locations on the screen after the locations where the parts are directed such that the velocity of the pulp stock along the screen remains substantially constant.

18. The process according to claim 17 wherein the flow of pulp stock is divided into a plurality of equal parts, the first part directed at the inlet end of the screen and the remaining parts directed at distances apart representing about 20% of the length of the screen.

19. In a rotary pulp screening device of the horizontal type, including a cylindrical housing with an inlet end, means defining a pulp stock entry at the inlet end, horizontal cylindrical screen within the cylindrical housing, shaft mounted for rotation extending on a central axis through the cylindrical housing having bearing support means adjacent both ends of the housing, rotary impeller mounted on the shaft within the screen, the impeller having a body with an inlet end and adjacent to the inlet end of the housing, the body having a shape with circular axial cross section extending axially from the inlet end, whose diameter increases from the inlet end axially along the screen, thus leaving a larger annular space at the inlet end, means for rotating the shaft and rotary impeller mounted thereon, impeller blades radiating from at least a portion of the body of the impeller and extending to within a short distance from the screen for the length of the screen, and pulp discharge outlet from the cylindrical housing exterior to the screen, the improvement comprising:

at least one substantially frusto-conical shaped baffle extending axially along the screen from the inlet end of the impeller, with the edge of the baffle adjacent the inlet end parallel to the edge of the baffle remote from the inlet end, the baffle being disposed in the annular space between the body of the impeller and the screen, the exterior surface of the baffle being joined to the impeller blades and having a shape to conform to the shape of the body of the impeller to define an annular axial cross sectional opening having a substantially equal axial cross sectional area from one edge of the baffle to the opposite end thereof, the baffle forming means dividing the flow of pulp stock entering at the inlet end so that a portion of the pulp stock passes across the exterior surface of the baffle and a portion of the pulp stock passes between the baffle and the body of the impeller, and whereby the substantially equal axial cross sectional area from one end of the baffle to the opposite end thereof maintains a substantially constant axial velocity of the pulp stock passing between the baffle and the body of the impeller.

20. The rotary pulp screening device according to claim 19 including an outer substantially frusto-conical baffle extending axially along the screen, the outer baffle being disposed in the annular space between the exterior surface of the baffle and the screen, the outer baffle being joined to the impeller blades, the outer baffle forming means dividing the flow of the portion of the pulp stock passing across the exterior surface of the baffle so that a further portion of the pulp stock passes between the baffle and the outer baffle, and a further portion passes across the exterior surface of the outer baffle.

21. The rotary pulp screening device according to claim 19 wherein a plurality of substantially frusto-conical shaped baffles are provided, extending downstream one after another.

22. The rotary impeller according to claim 14 wherein the annular axial cross sectional opening between the baffle and the body of the impeller has no impeller blades therein.

23. In a process of screening a pulp stock in a rotary pulp screening device of the horizontal type including, a cylindrical housing with an inlet end, means defining a pulp stock entry at the inlet end, horizontal cylindrical screen within the cylindrical housing, shaft mounted for rotation extending on a central axis through the cylindrical housing having bearing support means adjacent both ends of the housing, rotary impeller mounted on the shaft within the screen, the impeller having a body with an inlet end adjacent to the inlet end of the housing, the body having a shape with circular axial cross section extending axially from the inlet end whose diameter increases from the inlet end axially along the screen, thus leaving a larger annular space at the inlet end, means for rotating the shaft and rotary impeller mounted thereon, impeller blades radiating from at least a portion of the body of the impeller and extending to within a short distance from the screen for the length of the screen, at least one substantially frusto-conical shaped baffle concentric with the body of the impeller, extending from the inlet end of the impeller, adapted to divide the flow of pulp stock entering the annular inlet, the baffle forming an annular axial cross sectional opening between the baffle and the body of the impeller having a substantially similar cross sectional area at the inlet end as at the downstream end of the baffle, and the baffle joined to the impeller blades, the opening between the baffle and the body of the impeller having no impeller blades therein, and pulp discharge outlet from the cylindrical housing exterior to the screen, wherein pulp stock entering the annular inlet is rotated by the impeller blades, flows along the screen and mixes with dilution water, the pulp stock passing through the screen for substantially the full length of the screen exiting through the pulp discharge, the improvement comprising the steps of:

dividing the flow of pulp stock entering the annular inlet into a plurality of parts by the baffle so that the pulp stock passing between the impeller and the baffle is rotated by the impeller blades only after passing beyond the baffle, directing each of the parts to different locations along the length of the screen, such that the velocity of pulp stock along the screen is substantially constant, and adding dilution water to the pulp stock at further downstream locations on the screen after the locations where the parts are directed such that the velocity of the pulp stock along the screen remains substantially constant.

* * * * *